(12) United States Patent
Yadav et al.

(10) Patent No.: US 8,568,936 B1
(45) Date of Patent: Oct. 29, 2013

(54) SYSTEMS AND METHODS FOR ELECTROCHEMICAL SURFACE AREA RETENTION USING HYDROGEN CROSSOVER

(71) Applicant: Nissan North America, Inc., Franklin, TN (US)

(72) Inventors: Rameshwar Yadav, Farmington, MI (US); Gregory DiLeo, Ann Arbor, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/658,352

(22) Filed: Oct. 23, 2012

(51) Int. Cl.
*H01M 8/04* (2006.01)
(52) U.S. Cl.
USPC .................................................. 429/432
(58) Field of Classification Search
None
See application file for complete search history.

(56) References Cited

U.S. PATENT DOCUMENTS

| | | | |
|---|---|---|---|
| 6,461,751 B1 | 10/2002 | Boehm et al. | |
| 6,841,275 B2 * | 1/2005 | Pearson | 429/9 |
| 7,419,732 B2 | 9/2008 | Liu et al. | |
| 7,682,721 B2 | 3/2010 | Okamoto | |
| 7,713,644 B2 | 5/2010 | Goebel et al. | |
| 7,833,670 B2 * | 11/2010 | Matsuzaki et al. | 429/429 |
| 8,053,131 B2 * | 11/2011 | Son et al. | 429/450 |
| 2003/0198851 A1 * | 10/2003 | Sone et al. | 429/30 |
| 2005/0147855 A1 * | 7/2005 | Reiser et al. | 429/13 |
| 2007/0184318 A1 * | 8/2007 | Katano | 429/25 |
| 2010/0047631 A1 | 2/2010 | Madden et al. | |

OTHER PUBLICATIONS

Inaba et al., Gas crossover and membrane degradation in polymer electrolyte fuel cells, Electrochimica Acta 51 (2006)5746-57853, Available online Apr. 18, 2006.*
Yuan et al., A review of polymer electrolyte membrane fuel cell durability test protocols, Journal of Power Sources 196(2011) 9107-9116, Available online Aug. 23, 2011.*
T.T.H. Cheng, E Rogers, A.P. Young, S. Ye, V. Colbow, and S. Wessel, Effects of Crossover Hydrogen on Platinum Dissolution and Aggolmeration, Journal of Power Sources, 196 (2011), 7985-7988.
K. Asano and Y. Mugikura, Degradation of Pt Catalyst Layer in PEFCs During Load Cycling under Pressurized Conditions, ECS Transactions, 16 (2) 779-785 (2008).

* cited by examiner

*Primary Examiner* — Patrick Joseph Ryan
*Assistant Examiner* — Jose Colucci Rios
(74) *Attorney, Agent, or Firm* — Young, Basile, Hanlon & MacFarlane, P.C.

(57) ABSTRACT

Systems and methods for electrochemical surface area retention of fuel cell catalyst using hydrogen crossover are disclosed. One fuel cell system embodiment comprises a fuel cell including an anode having a fuel gas supply and a cathode having an air supply and a controller. The controller is configured to detect a high voltage condition in the fuel cell and increase hydrogen partial pressure in the cathode when the high voltage condition is detected.

20 Claims, 4 Drawing Sheets

SYSTEMS AND METHODS FOR ELECTROCHEMICAL SURFACE AREA RETENTION USING HYDROGEN CROSSOVER

TECHNICAL FIELD

The disclosure herein relates in general to methods for improving the performance of fuel cell catalyst, and in particular to reducing loss of electrochemical surface area of the fuel cell catalyst.

BACKGROUND

Fuel cells efficiently and electrochemically convert fuel into electric current, which may then be used to power electric circuits, such as drive systems for vehicles. A fuel cell containing a proton exchange membrane converts chemical energy to electrical energy using hydrogen as fuel, oxygen/air as oxidant and a catalyst. Catalyst performance is directly tied to fuel cell performance. The electrochemical reactions in a fuel cell occur on the surface of active metal catalysts. Atoms in the surface of the catalyst interact with the fuel and oxidant gases, making and breaking chemical bonds. Accordingly, catalyst surface area is a factor in the performance of a fuel cell.

SUMMARY

Disclosed herein are embodiments of systems and methods for electrochemical surface area retention of fuel cell catalyst using hydrogen crossover. One fuel cell system disclosed herein comprises a fuel cell including an anode having a fuel gas supply and a cathode having an air supply and a controller. The controller is configured to detect a high voltage condition in the fuel cell and increase hydrogen partial pressure in the cathode when the high voltage condition is detected.

One method of operating a fuel cell system as disclosed herein comprises detecting a high voltage condition in a fuel cell that has a an anode having a fuel gas supply and a cathode having an air supply. The hydrogen partial pressure is increased in the cathode when the high voltage condition is detected.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are systems and methods that extend fuel cell catalyst performance by reducing the loss of catalyst electrochemical surface area in fuel cells using proton exchange membranes.

Figure 1:
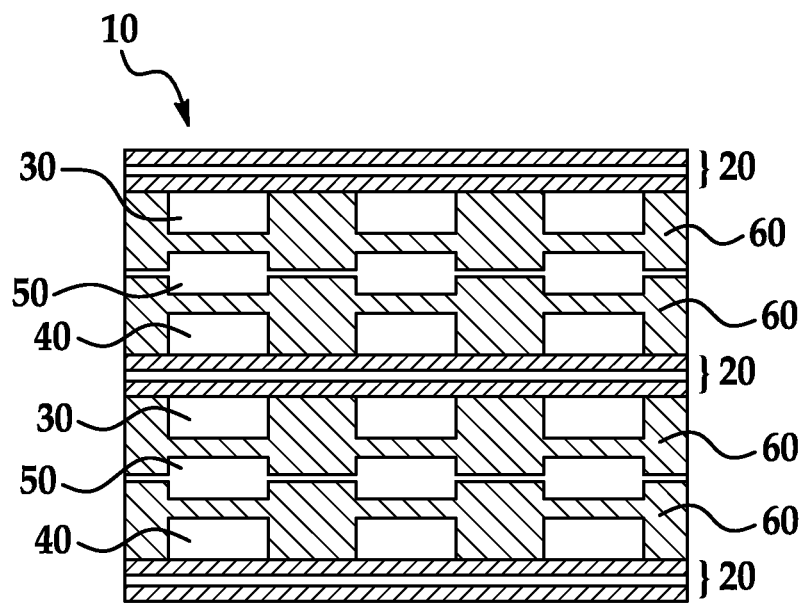
FIG. 1 is a schematic cross-sectional view of a fuel cell stack.

Proton exchange membrane fuel cells (PEMFCs) are electrochemical devices converting chemical energy to an electrical energy by using hydrogen as a fuel and oxygen/air as an oxidant. The proton exchange membrane fuel cell generally comprises five layers to form a fuel cell membrane electrode assembly, including a solid polymer electrolyte proton conducting membrane, two gas diffusion layers, and two catalyst layers. FIG. 1 shows a schematic cross-sectional illustration of a portion of a fuel cell stack 10. The illustration is provided as an example of the use of catalyst in fuel cells and is not meant to be limiting.

The fuel cell stack 10 is comprised of multiple membrane electrode assemblies 20. Fuel 30 such as hydrogen is fed to the anode side of a membrane electrode assembly 20, while an oxidant 40 such as oxygen or air is fed to the cathode side of the membrane electrode assembly 20. Coolant 50 is supplied between the fuel 30 and oxidant 40, the coolant 50 separated from the fuel 30 and oxidant 40 by separators 60.

Figure 2:
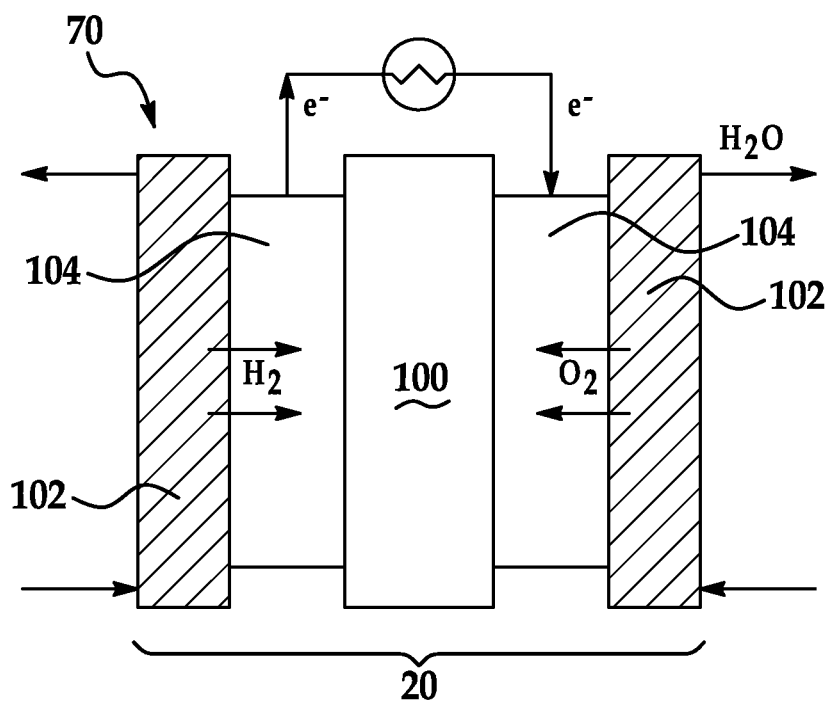
FIG. 2 is a schematic cross-sectional view of a membrane electrode assembly.

FIG. 2 is an illustration of one of the plurality of fuel cells 70 in the fuel cell stack 10. The fuel cell 70 is comprised of a single membrane electrode assembly 20. The membrane electrode assembly 20 has a catalyst coated membrane 100 with a gas diffusion layer 102 on opposing sides of the membrane 100. The membrane 100 has a catalyst layer 104 formed on opposing surfaces of the membrane 100, such that when assembled, the catalyst layers are each between the membrane 100 and a gas diffusion layer 102. Alternatively, a gas diffusion electrode is made by forming one catalyst layer 104 on a surface of two gas diffusion layers 102 and sandwiching the membrane 100 between the gas diffusion layers 102 such that the catalyst layers 104 contact the membrane 100. When fuel 30, such as hydrogen gas, is introduced into the fuel cell 70, the catalyst layer 104 of the catalyst coated membrane 100 splits hydrogen gas molecules into protons and electrons. The protons pass through the membrane 100 to react with the oxidant 40, such as air, forming water ($H_2O$). The electrons ($e^-$), which cannot pass through the membrane 100, must travel around it, thus creating the source of electrical energy.

To reduce the cost of fuel cells and to decrease environmental impact, much effort is being made to increase the performance and durability of catalysts such as those described with reference to FIGS. 1 and 2. Typical catalysts used in PEMFCs include traditional precious metal group (PGM) catalysts using one or a combination of a precious metal such as platinum, gold and iridium, and/or transition metals such as cobalt and nickel. Other catalysts used in PEMFCs can include non-PGM catalysts that are generally composed of carbon, nitrogen and transition metal forming a framework to provide active sites. A combination of PGM and non-PGM catalysts can also be used. The catalysts can be in various forms, such as alloys, coreshells, nanowires and nanoparticles.

Regardless of the type of catalyst used in the PEMFC, an important parameter in the performance of the fuel cell is the catalyst electrochemical surface area that is available for reduction of oxygen at the cathode. During operation of the PEMFC, the catalyst can dissolve, migrate and agglomerate, reducing the available electrochemical surface area and thereby reducing the performance of the fuel cell. For example, during operation of a fuel cell using a PGM catalyst containing platinum, the platinum dissolves, migrates and agglomerates into bigger nanoparticles due to oxidation that occurs from high potential, high humidity and high temperature occurring within the fuel cell. Platinum particles oxidize to platinum oxide in the presence of water and then form unstable $Pt^{2+}$ ions. These unstable $Pt^{2+}$ ions combine to form bigger platinum particles leading to loss in electrochemical surface area and performance. These unstable $Pt^{2+}$ ions also can migrate into the PEMFCs membrane, degrading the membrane, or can migrate into the cathode effluent.

Figure 3A:
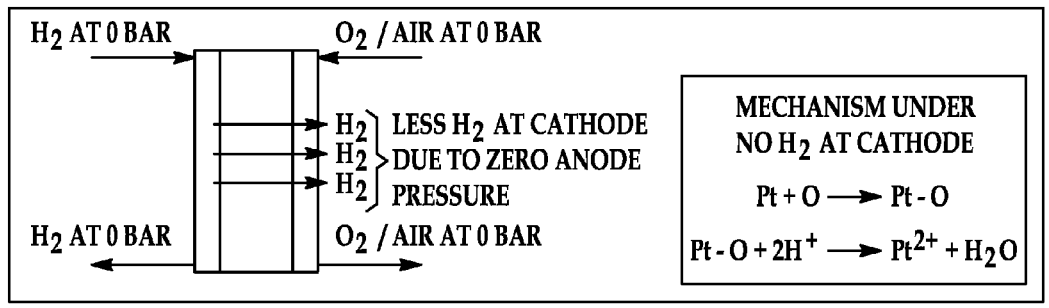
FIGS. 3A and 3B are schematics of platinum dissolution and hydrogen crossover at no differential pressure between the anode and cathode and positive differential pressure between the anode and cathode, respectively.

Also during normal operation of the PEMFC, some hydrogen crossover from the anode to the cathode occurs. This is due to the partial pressure difference of hydrogen between anode and cathode. FIG. 3A is a schematic illustration of this platinum dissolution mechanism during conventional operation of the PEMFC. The hydrogen crossover from the anode to the cathode illustrated in FIG. 3A is generally seen as a loss in fuel cell efficiency as this hydrogen is not being used to produce power.

Figure 3B:
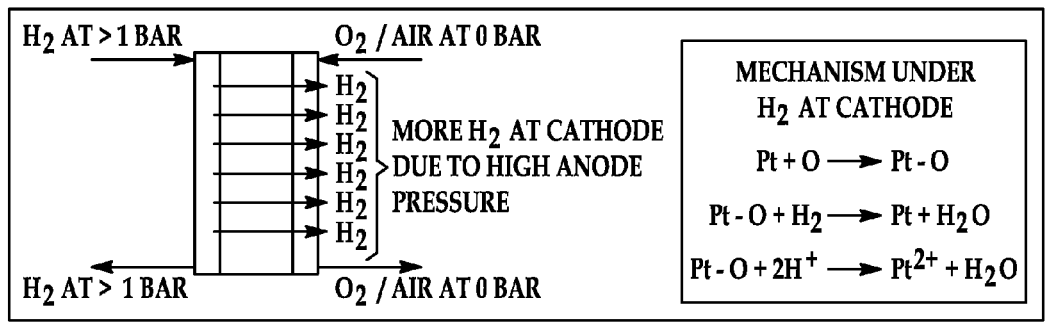

The embodiments disclosed herein increase the hydrogen partial pressure in the cathode by increasing the anode pressure and hydrogen crossover to decrease degradation of Pt catalyst and fuel cell performance. As shown in FIG. 3B, with an increased hydrogen crossover, and therefore an increased hydrogen partial pressure in the cathode, the platinum oxides are electrochemically reduced to platinum particles, preventing the formation of $Pt^{2+}$ ions. This will prevent the agglomeration of Pt particles and prevent the loss in electrochemical surface area. With fewer $Pt^{2+}$ ions available for migration into the membrane, degradation of the membrane will be also reduced.

Figure 4:
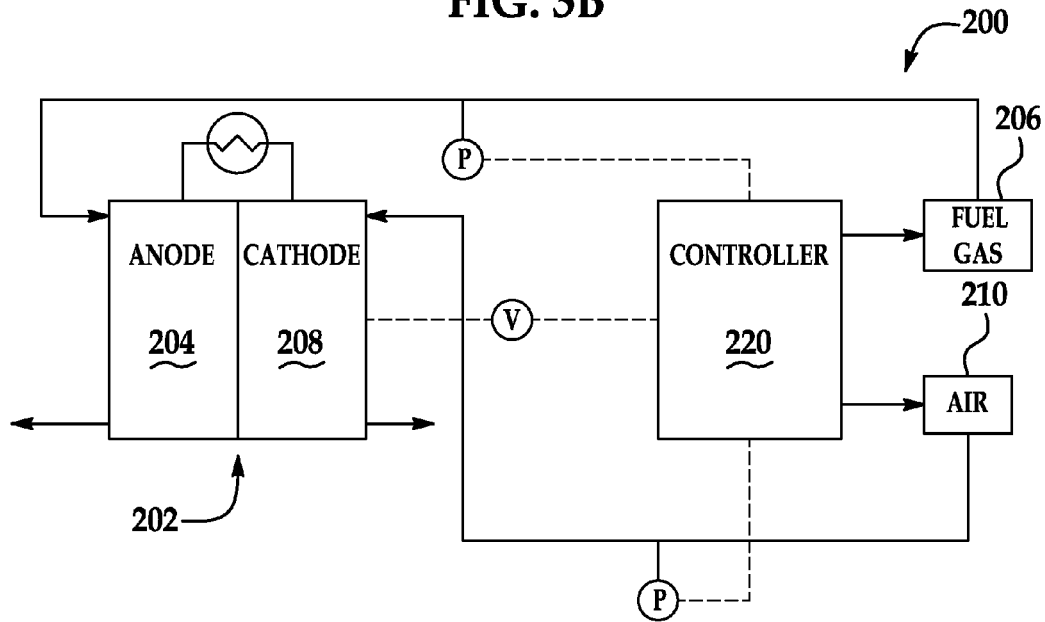
FIG. 4 is a schematic of a fuel cell system as disclosed herein.

FIG. 4 is a diagram of a fuel cell system disclosed herein for retaining the catalyst electrochemical surface area during operation of the fuel cell. The fuel cell system 200 comprises a fuel cell 202 having an anode 204 with a fuel gas supply 206 and a cathode 208 with an air supply 210. The system 200 has a controller 220 configured to detect a high voltage condition in the fuel cell 202 and increase hydrogen partial pressure in the cathode 208 when the high voltage condition is detected.

The controller 220 can be a control module (CM) or other electronic control unit (ECU), such as a microcomputer including a random access memory (RAM), a read-only memory (ROM) and a central processing unit (CPU) in addition to various input and output connections. Generally, the control functions described herein can be implemented by one or more software programs stored in internal or external memory and are performed by execution by the CPU. However, some or all of the functions could also be implemented by hardware components. Although the controller 220 is shown and described as a single controller for performing multiple functions, the functions described herein could be implemented by separate controllers which collectively comprise the illustrated controller 220.

The controller 220 is programmed to detect the high voltage condition of the fuel cell 202, because when the voltage is high, the catalyst dissolution and migration is typically higher. During these high voltage periods, the hydrogen partial pressure in the cathode can be increased to provide sufficient hydrogen at the cathode to reduce the resulting Pt2+ ions to platinum, thereby reducing ECA loss and degradation of the membrane when the potential for degradation is the highest. It is possible to maintain a higher hydrogen pressure in the anode throughout operation of the fuel cell to further reduce ECA loss and degradation of the membrane. However, fuel efficiency is impacted by increased hydrogen crossover from the anode to the cathode.

The high voltage condition can be detected using fuel cell potential, as a non-limiting example. The controller can be configured or programmed to detect a high voltage condition when the fuel cell potential is greater than about 0.8 volts. When the fuel cell potential is less than 0.8 volts, the voltage condition would be considered normal. The high voltage condition can also be detected by detecting one or more actions contributing to the high voltage condition. As non-limiting examples, an increase in accelerator opening, an idle state and a power demand from the activation of on-board devices such as the HVAC unit can be detected by the controller as a high voltage condition.

Alternatively or in addition to the high voltage situations described above, other high voltage indicators can be detected. For example, the controller 220 may be configured to detect the high voltage condition based on fuel cell temperature or fuel cell relative humidity. If the fuel cell temperature or relative humidity exceeds a predetermined threshold temperature or threshold relative humidity, the controller can detect a high voltage condition. The temperature and relative humidity of the fuel cell can also be used to adjust a predetermined threshold for fuel cell potential. The threshold potential for detecting a high voltage condition may be lowered when the temperature or relative humidity of the fuel cell exceeds a threshold limit. The controller 220 can also be configured to detect a high voltage condition based on the rate of the change in fuel cell potential. When the rate of change of the fuel cell potential increased beyond a predetermined rate, the high voltage condition detection can be triggered. Other high voltage indicators known to those skilled in the art are contemplated herein.

The controller 220 can be configured to increase the hydrogen partial pressure in the cathode 208 by maintaining an increased pressure on the anode 204 during high voltage conditions. For example, the controller 220 can be configured to control the fuel gas supply 206 to the anode 204 at a first pressure during fuel cell operation and control the fuel gas supply 206 to the anode 204 at a second pressure higher than the first pressure when the high voltage condition is detected. As a non-limiting example, the controller 220 can be configured to control the first pressure such that a pressure differential between the anode 204 and the cathode 208 is zero and to control the second pressure such that the pressure differential is about 1.25 bar or greater between the anode 204 and the cathode 208. To increase control of the system, the controller 220 can be further configured to maintain a constant air flow from the air supply 210 to maintain a constant air pressure at the cathode 208.

The controller 220 can alternatively be configured to increase the hydrogen partial pressure in the cathode 208 by controlling the air supply 208 to the cathode 208 at a first pressure during fuel cell operation and controlling the air supply 210 to the cathode 208 at a second pressure lower than the first pressure when the high voltage condition is detected. The controller 220 can be configured to control the second pressure such that the differential pressure is about 1.25 bar or greater between the anode 204 and the cathode 208, for example.

Figure 5:
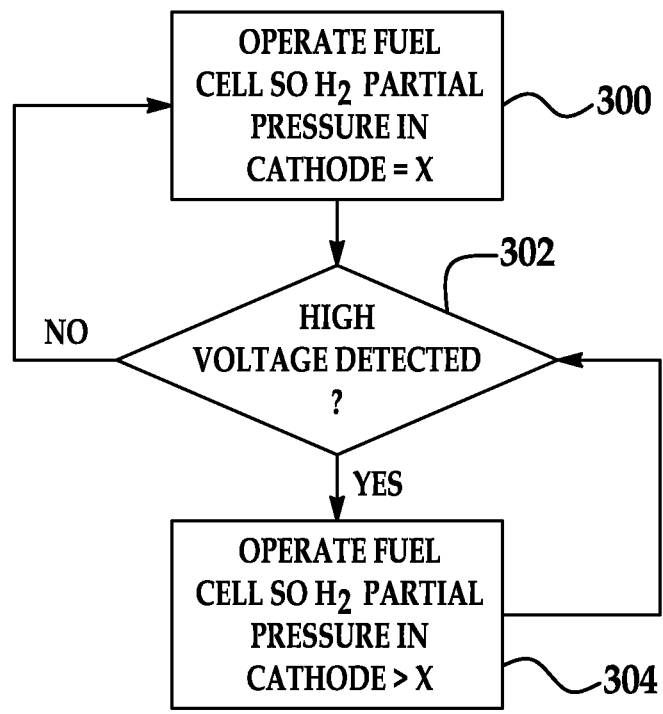
FIG. 5 is a flow diagram of a method for controlling a fuel cell as disclosed herein.

Also disclosed herein are methods of controlling a fuel cell to retain catalyst electrochemical surface area throughout operation. One method shown in FIG. 5 comprises operating the fuel cell under normal conditions in step 300, resulting in a first hydrogen partial pressure X in the cathode. If a high voltage condition is detected in the fuel cell in step 302, the fuel cell is operated so that the hydrogen partial pressure in the cathode is increased to greater than X in step 304.

The high voltage condition can be detected using fuel cell potential, as a non-limiting example. A high voltage condition can be detected when the fuel cell potential is greater than about 0.8 volts. When the fuel cell potential is less than 0.8 volts, the voltage condition would be considered normal. The high voltage condition can also be detected by detecting one or more actions contributing to the high voltage condition. As non-limiting examples, a decrease in accelerator opening, an idle state and a low power demand from the activation of on-board devices such as the HVAC unit can be detected by the controller as a high voltage condition.

Alternatively or in addition to the high voltage situations described above, other high voltage indicators can be detected. For example, the high voltage condition may be based on fuel cell temperature or fuel cell relative humidity. If the fuel cell temperature or relative humidity exceeds a predetermined threshold temperature or threshold relative humidity, a high voltage condition would be detected. The temperature and relative humidity of the fuel cell can also be used to adjust a predetermined threshold for fuel cell potential. The threshold potential for detecting a high voltage condition may be lowered when the temperature or relative humidity of the fuel cell exceeds a threshold limit. A high voltage condition can also be based on the rate of the change in fuel cell potential. When the rate of change of the fuel cell potential increased beyond a predetermined rate, the high voltage condition detection can be triggered. Other high voltage indicators known to those skilled in the art are contemplated herein.

Figure 6:
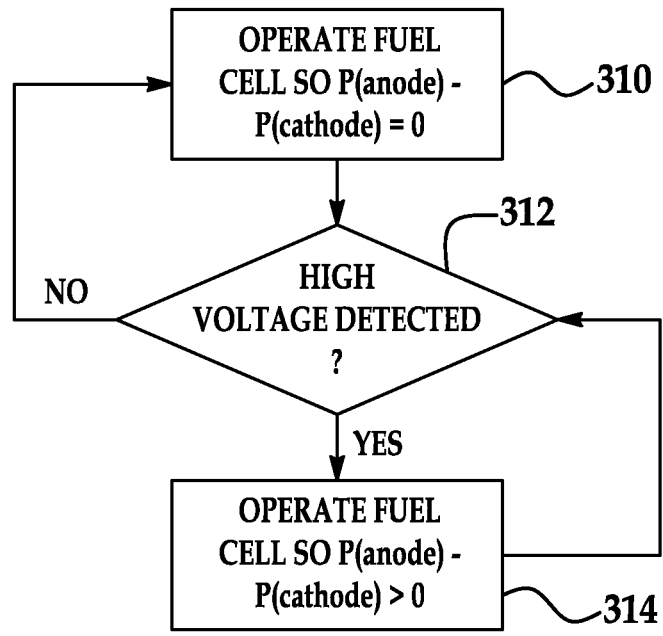
FIG. 6 is a flow diagram of an embodiment of the method for controlling a fuel cell as disclosed herein.

The hydrogen pressure in the cathode can be increased by subjecting the anode to increased pressure during high voltage conditions. For example, the fuel gas supply to the anode can be controlled at a first pressure during fuel cell operation and at a second pressure higher than the first pressure when the high voltage condition is detected, as illustrated in FIG. 6. In step 310, the fuel cell is operated under normal conditions so that the differential pressure between the anode and cathode is about zero, plus or minus a negligible margin of fluctuation due to gas flow at the anode and cathode. If a high voltage condition is detected in the fuel cell in step 312, the fuel cell is operated in step 314 so that the differential pressure between the anode and the cathode is greater than 0 bar. For example, in a small-scale lab experiment, about 1.25 bar was sufficient.

Alternatively, the hydrogen pressure can be increased in the cathode by controlling the air supply to the cathode at a first pressure during fuel cell operation and controlling the air supply to the cathode at a second pressure lower than the first pressure when the high voltage condition is detected. For example, the second pressure can be selected such that the differential pressure is about 1.25 bar or greater between the anode and the cathode.

Platinum catalyst durability of two identical membrane electrode assemblies (MEA) was evaluated to demonstrate the effect of hydrogen crossover on platinum dissolution and electrochemical surface area retention for different anode pressures. The following tests were done sequentially to compare the effect of load cycling: (1) beginning of life (BoL) IV performance test; (2) load cycling test (potential cycling between 0.6 V to 0.95V with a rectangle wave form) with electrochemical surface area measurement by cyclic voltammetry (CV); and (3) end of life (EoL) IV performance test. For both MEAs, the anode pressure was changed only during load (potential) cycling to evaluate the effect of anode pressure and hydrogen crossover on electrochemical surface area change. For the first MEA, anode pressure was maintained at 0.0 bar during load cycling and for the second MEA, anode pressure was maintained at 1.25 bar only during load cycling. Hydrogen on the cathode can affect the electrochemical surface area measurement by CV. Therefore, for accuracy, the cathode of the second MEA was purged with nitrogen for a sufficient time to remove any hydrogen before electrochemical surface area measurement by the CV.

Figure 7:
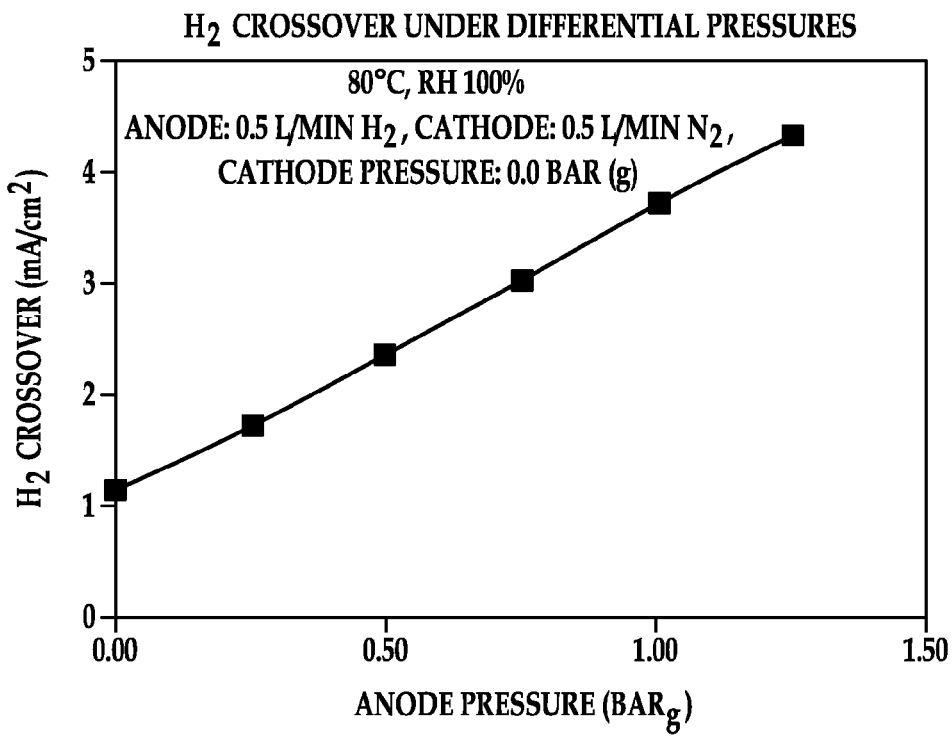
FIG. 7 is a graph of hydrogen crossover under different differential pressures.
Figure 8:
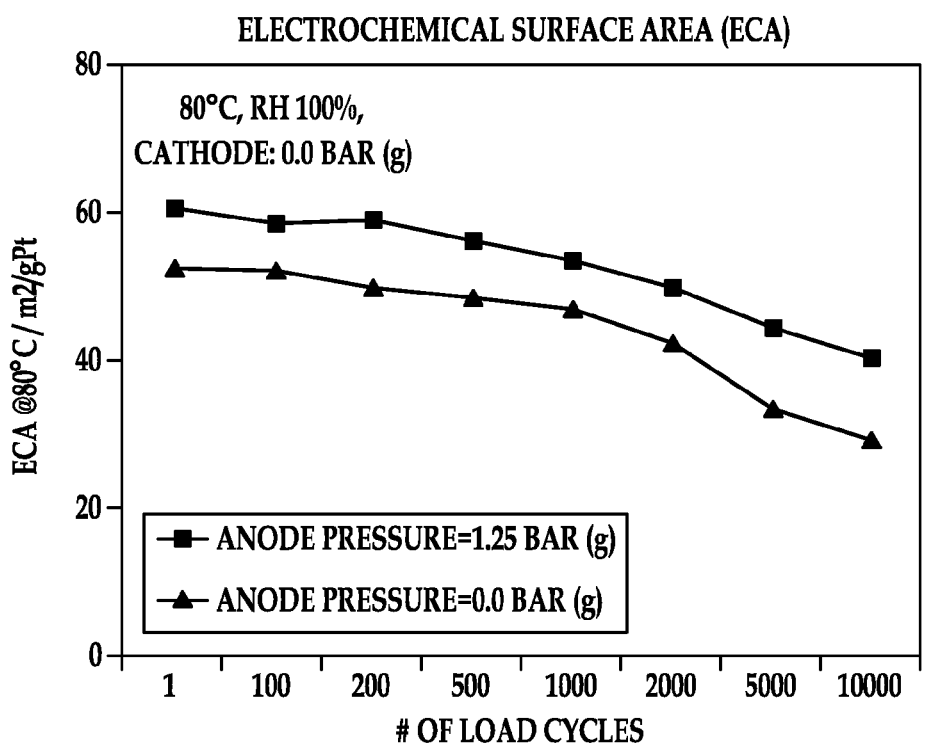
FIG. 8 is a graph of electrochemical surface area loss at different anode pressures over multiple load cycles.

FIG. 7 illustrates the increase in hydrogen crossover as the anode pressure is increased. FIG. 8 shows electrochemical surface area as a function of load cycles for the two MEAs. It is clear from FIG. 8 that the MEA tested under load cycling with an anode pressure of 1.25 bar shows only 34% electrochemical surface area loss, whereas the MEA tested under load cycling with an anode pressure of 0.0 bar shows 44% electrochemical surface area loss. As shown, an increased hydrogen presence at the cathode during load cycling leads to less electrochemical surface area loss. This reduced loss of electrochemical surface area due to increased hydrogen crossover can be used to extend the life and durability of catalyst used in PEMFCs.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel cell system comprising:
a fuel cell including an anode having a fuel gas supply and a cathode having an air supply; and
a controller configured to:
detect a high voltage condition in the fuel cell; and
increase hydrogen partial pressure in the cathode when the high voltage condition is detected.

2. The fuel cell system of claim 1, wherein the controller is configured to increase the hydrogen partial pressure in the cathode by:
controlling the fuel gas supply to the anode at a first pressure during fuel cell operation; and
controlling the fuel gas supply to the anode at a second pressure higher than the first pressure when the high voltage condition is detected.

3. The fuel cell system of claim 2, wherein the controller is configured to control the first pressure such that a differential pressure between the anode and the cathode is zero.

4. The fuel cell system of claim 2, wherein the controller is configured to control the second pressure such that a differential pressure is greater than 0 between the anode and the cathode.

5. The fuel cell system of claim 2, wherein the controller is further configured to maintain a constant air supply to maintain a constant air pressure at the cathode.

6. The fuel cell system of claim 1, wherein the high voltage condition is detected based on fuel cell potential.

7. The fuel cell system of claim 1, wherein the high voltage condition is detected when a fuel cell potential is greater than about 0.8 volts.

8. The fuel cell system of claim 1, wherein the high voltage condition is detected based on fuel cell temperature.

9. The fuel cell system of claim 1, wherein the controller is configured to increase the hydrogen pressure in the cathode by:

controlling the air supply to the cathode at a first pressure during fuel cell operation; and controlling the air supply to the cathode at a second pressure lower than the first pressure when the high voltage condition is detected.

10. The fuel cell system of claim 9, wherein the controller is configured to control the second pressure such that a differential pressure is greater than 0 between the anode and the cathode.

11. A method of operating a fuel cell system having a fuel cell comprising:

detecting a high voltage condition in the fuel cell, the fuel cell comprising an anode having a fuel gas supply and a cathode having an air supply; and increasing hydrogen partial pressure in the cathode when the high voltage condition is detected.

12. The method of claim 11, wherein increasing the hydrogen partial pressure in the cathode comprises:

controlling the fuel gas supply to the anode at a first pressure during fuel cell operation; and controlling the fuel gas supply to the anode at a second pressure higher than the first pressure when the high voltage condition is detected.

13. The method of claim 12, wherein the first pressure is controlled such that a differential pressure between the anode and the cathode is zero.

14. The method of claim 12, wherein the second pressure is controlled such that a pressure differential is greater than 0 between the anode and the cathode.

15. The method of claim 12 further comprising:

maintaining a constant air supply to maintain a constant air pressure at the cathode.

16. The method of claim 11, wherein detecting the high voltage condition comprises detecting a fuel cell potential greater than about 0.8 volts.

17. The method of claim 11, wherein detecting the high voltage condition comprises detecting a fuel cell temperature above a predetermined temperature.

18. The method of claim 11, wherein increasing the hydrogen partial pressure in the cathode comprises:

controlling the air supply to the cathode at a first pressure during fuel cell operation; and controlling the air supply to the cathode at a second pressure lower than the first pressure when the high voltage condition is detected.

19. The method of claim 18, wherein the second pressure is controlled such that a differential pressure is about greater than 0 between the anode and the cathode.

20. The method of claim 18, wherein detecting the high voltage condition comprises detecting a fuel cell potential greater than about 0.8 volts.

* * * * *